Patented Mar. 27, 1934

1,952,706

UNITED STATES PATENT OFFICE 1,952,706

RUBBER-BITUMINOUS COMPOSITION

Albert C. Fischer, Chicago, Ill.

No Drawing. Application September 26, 1930, Serial No. 484,716

5 Claims. (Cl. 106—23)

This invention relates to composition material, and particularly to composition constructional material comprising an intermixed mass of compressible and elastic character.

The invention consists in the features, combinations, and arrangements hereinafter described or claimed, for carrying out the above stated object and such other objects as will hereinafter appear.

In general, the invention comprises a composition of rubber and bituminous-emulsion intimately mixed together into a cohesive, plastic mass of rubbery character. A filler may be included in the composition to give body to the mass, although this ingredient is not indispensable. It may be eliminated or used as desired.

The invention is typified by a rubber and bituminous-emulsion composition. The rubber ingredient may be represented by crude, reclaimed rubber or the like and comprises substantially fifty (50) per cent of the composition. This is mixed with about fifty (50) per cent of bituminous-aqueous, bituminous-soap, bituminous-clay emulsion or the like.

There may be included with the rubber and bituminous-emulsion mixture a small amount of fibrous filling material in the form of animal, mineral, or vegetable fibers. Sawdust, for example, may represent a suitable fibrous filler. As this filler is absorbent, it may be advantageously treated with oil to prevent any of the other constituents of the mixture from being absorbed thereby. Non-absorbent fibres may be used in lieu of the sawdust to obviate treatment thereof to render the same non-absorbent. The sawdust cooperates with the rubber ingredient to provide a compressible and elastic quality in the mass, as its resilient character is preserved by preventing absorption of the ingredients of the composition. The inherent compressible character of the sawdust is retained in the ultimate product.

The composition is especially adapted for use in coating, filling cracks or spacing rigid units to allow for contraction and expansion, and may be poured in place without heating.

The rubber incorporated may be raw or vulcanized rubber, as distinguished from hard rubber dust etc. Hard rubber dust may be used as a filler. It is preferably that the rubber be finely ground and the smaller the particles the more effective is the fluidity of the product and its adaptability as a filler for pouring into the crevice.

Obviously the invention is not limited to the details of the embodiment above described, which may be variously modified. Moreover, it is not indispensable that all features be employed to advantage in various different combinations and sub-combinations.

I claim:

1. A compressible and elastic composition comprising rubber, fibrous material and bituminous-emulsion mixed together into a cohesive mass, said fibrous material being free from saturation by other ingredients of the composition.

2. A compressible and elastic composition comprising rubber, bituminous-emulsion, and fibrous material mixed together into a cohesive mass, said fibrous material being non-absorbent to other ingredients of the composition.

3. A compressible and elastic composition comprising rubber, bituminous-emulsion, and fibrous material mixed together into a cohesive mass, said fibrous material being non-absorbent to prevent impregnation by other ingredients of the composition.

4. A compressible and elastic composition comprising rubber, bituminous-emulsion, and fibrous material mixed together into a cohesive mass, said fibrous material being treated with oil to prevent any substantial impregnation by other ingredients of the composition.

5. A compressible and elastic composition comprising rubber, bituminous-emulsion, and fibrous material mixed together into a cohesive mass, said fibrous material being treated with some substance to prevent any substantial impregnation by other ingredients of the composition.

ALBERT C. FISCHER.